(12) United States Patent
Palanki et al.

(10) Patent No.: US 8,837,609 B2
(45) Date of Patent: Sep. 16, 2014

(54) GUARD INDEPENDENT SIGNAL MAPPING

(75) Inventors: Ravi Palanki, San Diego, CA (US);
Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 951 days.

(21) Appl. No.: 12/446,701

(22) PCT Filed: Oct. 23, 2007

(86) PCT No.: PCT/US2007/082278
§ 371 (c)(1),
(2), (4) Date: Apr. 22, 2009

(87) PCT Pub. No.: WO2008/052001
PCT Pub. Date: May 2, 2008

(65) Prior Publication Data
US 2010/0014603 A1 Jan. 21, 2010

Related U.S. Application Data

(60) Provisional application No. 60/862,687, filed on Oct. 24, 2006.

(51) Int. Cl.
*H04L 27/28* (2006.01)
*H04L 5/02* (2006.01)
*H04L 27/26* (2006.01)
*H04B 7/04* (2006.01)

(52) U.S. Cl.
CPC .............. *H04L 27/261* (2013.01); *H04L 5/023* (2013.01); *H04B 7/04* (2013.01); *H04L 27/2602* (2013.01)
USPC .......................................... 375/260; 375/295

(58) Field of Classification Search
CPC . H04L 5/023; H04L 27/2602; H04L 27/2608; H04L 27/261; H04L 27/2611
USPC .................................. 375/260, 267, 295, 296
See application file for complete search history.

(56) References Cited

U.S. PATENT DOCUMENTS 6,657,950 B1 12/2003 Jones, IV et al.
7,054,375 B2 5/2006 Kannan et al.
(Continued)

FOREIGN PATENT DOCUMENTS

CN 1549472 A 11/2004
JP H1132026 A 2/1999
(Continued)

OTHER PUBLICATIONS

Saito, M. et al.: "Cluster Architecture for Reconfigurable Signal Processing Engine for Wireless Communication," (2005).
(Continued)

*Primary Examiner* — David B. Lugo
(74) *Attorney, Agent, or Firm* — Stanton Braden

(57) ABSTRACT

Systems and methodologies are described that facilitate guard bandwidth independent mapping and de-mapping of bandwidth in a wireless communication system. Broadcast signals can be created as if all bandwidth were available, and guard bandwidth can be initialized over the utilized bandwidth such to puncture the data existing in the guard bandwidth. Upon decoding the broadcast signal, size of the guard bandwidth can be predetermined or estimated allowing a center portion of the signal to be decoded without decoding the guard bandwidth. In this regard, the decoder of the signal need not find exact positions of the guard bandwidth as transforming and decoding the center portion can provide a substantial portion of the signal to interpret the signal.

22 Claims, 11 Drawing Sheets

(56) References Cited

U.S. PATENT DOCUMENTS

| | | |
|---|---|---|
| 7,099,397 B2 | 8/2006 | Lee et al. |
| 7,173,961 B2 | 2/2007 | Vadde |
| 7,916,812 B2 | 3/2011 | Cousineau |
| 2002/0122499 A1 | 9/2002 | Kannan et al. |
| 2004/0114504 A1 | 6/2004 | Jung et al. |
| 2006/0039273 A1* | 2/2006 | Gore et al. .................... 370/208 |
| 2007/0022441 A1 | 1/2007 | Nystrom et al. |
| 2007/0211661 A1* | 9/2007 | Tee et al. ....................... 370/329 |

FOREIGN PATENT DOCUMENTS

| | | |
|---|---|---|
| JP | 2003259448 A | 9/2003 |
| JP | 2004507972 A | 3/2004 |
| JP | 2004254335 A | 9/2004 |
| JP | 2006020128 A | 1/2006 |
| JP | 2006520576 A | 9/2006 |
| JP | 2011032026 A | 2/2011 |
| RU | 2265280 | 11/2005 |
| RU | 2005138861 | 6/2006 |
| WO | WO-2004079978 A2 | 9/2004 |
| WO | 2005064875 | 7/2005 |
| WO | 2006099322 A1 | 9/2006 |

OTHER PUBLICATIONS

Schmidt, et al., "Reducing the peak to average power ratio of multicarrier signals by adaptive subcarrier selection," IEEE 1998 International Conference on Universal Personal Communications, 1998. ICUPC '98. Florence, Italy Oct. 5-9, 1998, vol. 2, pp. 933.

Written Opinion—PCT/US07/082278, International Searching Authority—European Patent Office, Jul. 28, 2008.

Taiwan Search Report—TW096139895—TIPO—Feb. 20, 2012.

Prasetyo, B.Y., et al., On the guard band-based coarse frequency offset estimation technique for burst OFDM systems, Vehicular Technology Conference Proceedings, 2000. VTC 2000-Spring Tokyo. 2000 IEEE 51st, 2000, vol. 1, pp. 220-224.

Yoshida, H., et al., "A study on Channel Estimation Scheme for OFDM Transmission in the Presence of Guard Band", Proceedings 1 of the Communications Society Conference of IEICE, p. 468, B-5-68, Sep. 7, 2005.

International Search Report—PCT/US2007/082278, International Search Authority—European Patent Office—Jul. 28, 2008.

* cited by examiner

GUARD INDEPENDENT SIGNAL MAPPING

CROSS-REFERENCE TO RELATED APPLICATIONS

This application claims the benefit of U.S. Provisional Patent application Ser. No. 60/862,687 entitled "GUARD TONE INDEPENDENT SYMBOL TO TONE MAPPING STRUCTURE FOR WIRELESS COMMUNICATION SYSTEMS" which was filed Oct. 24, 2006. The entirety of the aforementioned application is herein incorporated by reference.

BACKGROUND

I. Field

The following description relates generally to wireless communications, and more particularly to guard tone independent mapping and de-mapping of symbols to tones in a wireless communication system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In such systems, base stations, or other access points, can send out broadcast signals consumable by a plurality of mobile devices (e.g. cellular phones and the like) to provide information regarding presence of the base station and other information related thereto. For example, the information can comprise protocol for initiating communication with the base station. Base stations can be provided for multiple carriers, for instance, each of which can send broadcast signals over a forward link to the plurality of mobile devices in a MIMO configuration. The broadcast signals can be sent on similar channels using contiguous or adjacent frequencies.

To this end, guard bandwidth can be provided between the contiguous or adjacent frequencies to prevent data from one carrier leaking over to bandwidth of another carrier. To facilitate operating with the guard bandwidth, market forces have been moving towards broadcasting the data starting after the guard bandwidth and decoding the data by locating the start of the guard bandwidth upon receiving such. Such locating can cause many processor cycles as portions of the bandwidth must be interpreted until the end of the guard bandwidth at the beginning of the total bandwidth and/or the beginning of the guard bandwidth at the end of the total bandwidth are located.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating guard tone independent mapping of symbols in a broadcast signal in wireless communication systems. A plurality of symbols related to a broadcast signal can be initialized across an entirety of tones of a bandwidth without regard for possible guard tone locations, for example. The symbols mapped to guard tone locations can be subsequently zeroed out and the symbols effectively disregarded. Thus, the signal is initialized independent of the guard tones locations, for example.

Another aspect relates to a wireless communications apparatus. The wireless communications apparatus can include at least one processor configured to map a plurality of broadcast symbols across a bandwidth and zero out portions of the broadcast symbols that map to guard bandwidth. The wireless communications apparatus can also include a memory coupled to the at least one processor.

Yet another aspect relates to a wireless communications apparatus that facilitates guard tone independent mapping of signal symbols across a bandwidth. The wireless communications apparatus can include means for creating a plurality of symbols for a signal and means for mapping the plurality of symbols to substantially all tones of a bandwidth. The wireless communications apparatus can also include means for puncturing symbols mapped to guard tones with zero energy.

Still another aspect relates to a computer program product, which can have a computer-readable medium including code for causing at least one computer to generate a plurality of symbols related to a signal. The code can also cause the at least one computer to map the plurality of symbols to a predetermined plurality of tones across a bandwidth. Moreover, the code can additional cause the at least one computer to zero out one or more of the plurality of symbols mapped to guard tones.

In accordance with another aspect, an apparatus in a wireless communication system can include a processor configured to create a plurality of symbols for a signal, map the plurality of symbols to substantially all tones of a bandwidth, and puncture symbols mapped to guard tones with zero energy. Also, the apparatus can include a memory coupled to the processor.

According to related aspects, a method that facilitates guard tone independent decoding of a broadcast signal is described herein. The signal can be received as a plurality of tones, some of which can be guard tones. The guard tones can exist on either end of the bandwidth used to transmit the signal, and a number of guard tones can be estimated such that a center portion of the bandwidth, excluding the estimated guard tones at either end, can be de-mapped to interpret the signal.

Another aspect relates to a wireless communications apparatus. The wireless communications apparatus can include at least one processor configured to estimate a number of guard tones on either side of a received bandwidth and de-map a center portion of the bandwidth, free from the estimated guard tone locations, to produce a plurality of symbols. The wireless communications apparatus can also include a memory coupled to the at least one processor.

Yet another aspect relates to a wireless communication apparatus that decodes a guard tone independent portion of a signal. The apparatus can comprise means for receiving a signal across a bandwidth and means for estimating a size of a guard portion of the bandwidth. The wireless communications apparatus can also comprise means for decoding a center portion of the signal independent of the estimated guard bandwidth size.

Still another aspect relates to a computer program product, which can have a computer-readable medium including code for causing at least one computer to receive a signal as a plurality of tones across a bandwidth. The code can also cause the at least one computer to estimate a number of guard tones that are possibly transmitted across the bandwidth and de-map a central portion of the plurality of tones exclusive of the estimated guard tones to render a plurality of symbols.

In accordance with another aspect, an apparatus can be provided in a wireless communication system including a processor configured to receive a signal across a bandwidth, estimate a size of a guard portion of the bandwidth, and decode a center portion of the signal independent of the estimated guard bandwidth size. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
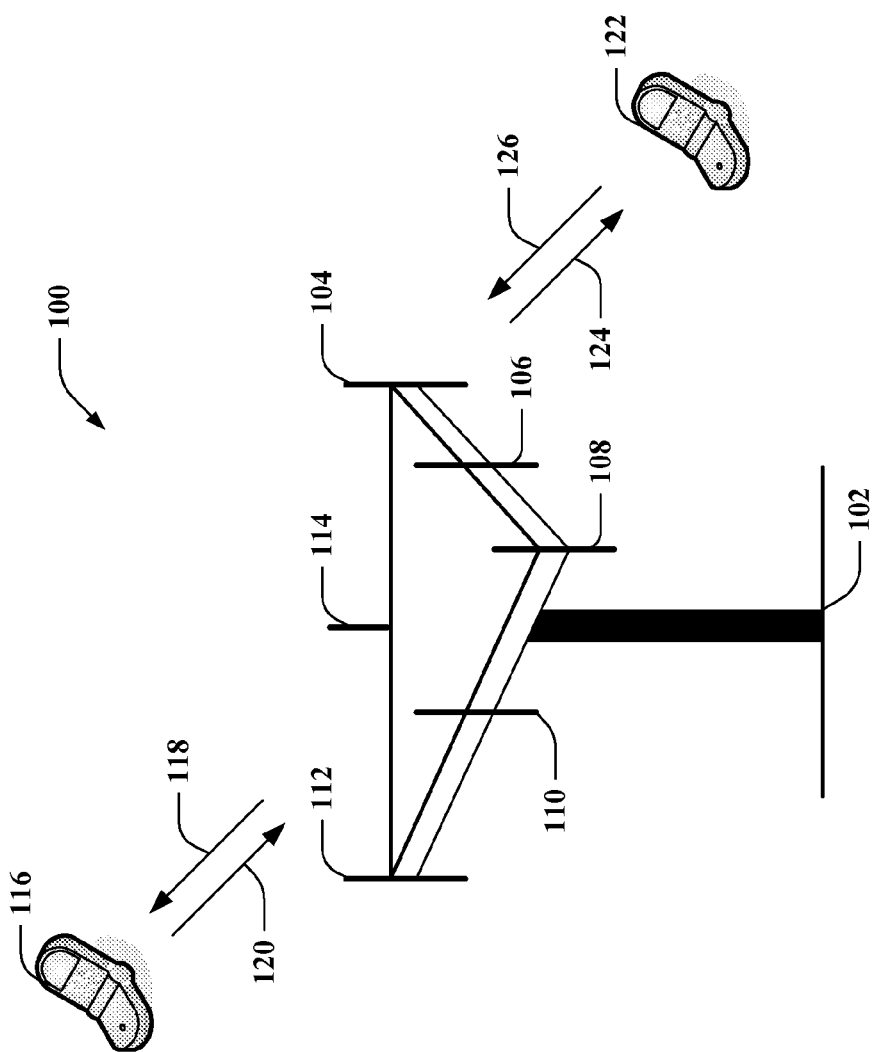
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

According to an example, system 100 can be a multiple-input multiple-output (MIMO) communication system. Further, system 100 can utilize any type of duplexing technique to divide communication channels (e.g., forward link, reverse link, . . . ) such as FDD, TDD, and the like. Moreover, system 100 can employ guard bandwidth techniques allowing multiple carriers to communicate on adjacent communication channels without meddling transmissions; such interference can cause error and unwanted results in communication. By way of example, base station 102 can encode and transmit forward links 118 and 124 to mobile devices 116 and 122 independent of existing guard bandwidth such that the mobile devices 116 and 122 need not determine the size of the guard bandwidth, and hence the beginning of the transmission, to properly decode the transmission. Rather, the mobile devices 116 and 122 can assume a portion of bandwidth in the middle is not guarded and can convert the middle portion to a frequency domain to determine if the portion is sufficient for reliable decoding of the communications, for example. This removes dependency on mapping guard tones from the mobile devices 116 and 122 since the determination process can be a single conversion and decode instead of attempting to determine guard tone location through multiple conversion and/or decoding steps.

Base station 102 can transmit a broadcast over a channel ignoring the guard portion. For example, where broadcast symbols are mapped to tones for transformation into a time domain, the base station 102 can zero out (e.g. reduce energy to substantially zero or a low number, modulate symbols with zero energy, and the like) the symbols mapped to the guard tones. In this regard, the guard tones stay in tact, but the base station 102 does not have to determine where the guard tones are located to begin the transmission at that point. Likewise, the mobile devices 116 and 122 need not locate the beginning of the transmission by guessing location of the guard tones. Rather, the mobile devices 116 and 122 can transform and decode a packet from a middle portion of the transmission, for example, by guessing a number of guard tones and reading all but that number. Guessing a reasonable number of guard tones can almost guarantee that guard tones will not be decoded by the mobile devices 116 and 122 and that enough of the transmission will be decoded to discern at least one aspect of the transmission according to one example. Additionally, according to another example, where a successful decoding has occurred, the mobile devices 116 and 122 can attempt to transform and/or decode the packet from a broader portion on the next transmission until the correct size is determined, for example. In this regard, communication is not lost or delayed while attempting to infer a number of guard tones by the mobile devices 116 and 122.

Figure 2:
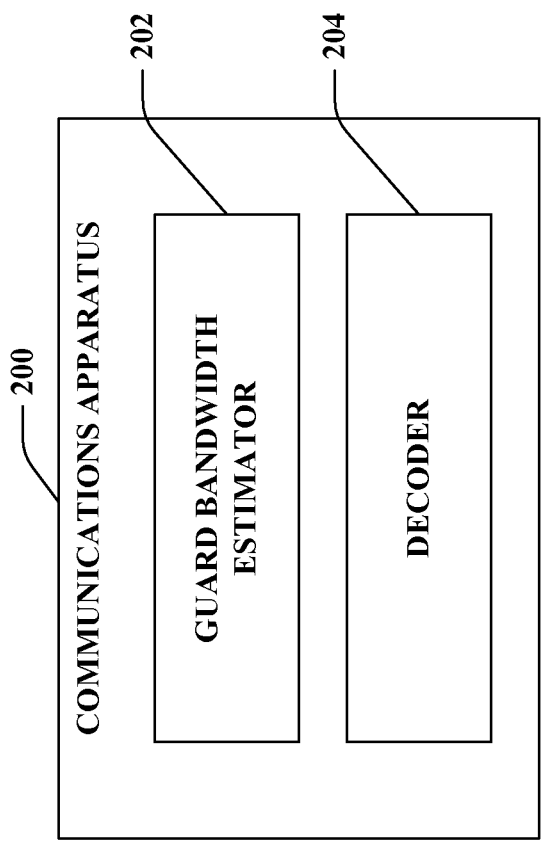
FIG. 2 is an illustration of an example communications apparatus for employment within a wireless communications environment.

Turning to FIG. 2, a communications apparatus 200 for a wireless communications environment is illustrated. Communications apparatus 200 can be a mobile device or a portion thereof, for example. Communications apparatus 200 can comprise a guard bandwidth estimator 202, that can estimate or predetermine a guard bandwidth size of a broadcast signal to facilitate transforming a readable portion of the signal to a frequency domain, along with a decoder 204 to decode the portion into a data packet. According to an example, the communications apparatus 200 can receive the broadcast signal from a base station. The communications apparatus 200 can utilize the guard bandwidth estimator to estimate sizes and positions of guard bandwidth and transform a center portion of the signal that likely does not contain guard bandwidth and decode the portion to produce a data packet using the decoder 204. For example, the guard bandwidth can be employed on each side of the signal to allow other carriers to transmit on substantially similar channels. In this regard, the communications apparatus 200 can receive the signal and utilize the guard bandwidth estimator 202 to estimate the size of the guard bandwidth, which can be similar in size on each side of the total bandwidth. Using the estimation, the decoder 204 can be leveraged to decode a transformed center portion of the bandwidth to mitigate encountering guard bandwidth, for example. In an example, the guard bandwidth estimator 202 can estimate a smaller size of guard bandwidth on subsequent requests until guard bandwidth is encountered to eventually arrive at the correct full bandwidth size, for example. It is to be appreciated that the guard bandwidth estimator 202 can additionally or alternatively estimate the bandwidth size not having the guard bandwidth.

According to an example, communications apparatus 200 can be utilized in a FDD MIMO system where a forward link broadcast signal can be transmitted by a base station. The broadcast signal can be a modulated sequence of tones having a number of guard tones at the edges to facilitate interruption free communication of adjacent carriers, for example. The communications apparatus 200 can decode/demap a center section of the broadcast signal into a series of symbols and decode a data packet from the symbols using the decoder 204, enough to obtain a relevant portion of the signal and to mitigate the need to determine exact guard tone position. For example, in a system using x tones or signal bins, the first and last y bins can be used for guard tones. The communications apparatus 200 can receive a broadcast signal from the base station with the above configuration and can read an estimated number of tones in the center to avoid transforming and/or decoding guard tones. For example, the guard bandwidth estimator 202 can estimate or predetermine an arbitrary number of guard tones, n, and transform the center x-n tones and/or decode such to a data packet to evaluate the broadcast signal. Additionally, a fast Fourier transform (FFT) can be performed with respect to the tones before decoding to transform the tones, for example. It is to be appreciated that if no guard tones were read during the transforming/decoding, the guard bandwidth estimator 202 can decrease the estimated number of guard tones for one or more subsequent signal decodings, for example. Moreover, the guard bandwidth estimator 202 can additionally or alternatively estimate the number of non-guard tones and increase that number following successfully transforming and/or decoding.

According to another example, the guard bandwidth estimator 202 can estimate a guard bandwidth size and sample the signal until the appropriate bandwidth size is determined. Additionally, where bandwidth is left untransformed or undecoded as not being a part of the estimated center portion of total actual bandwidth, the decoder 204 can continue to decode or the bandwidth transformed until the guard bandwidth is encountered, for example. Moreover, although not shown, it is to be appreciated that communications apparatus 200 can include memory that retains an estimated guard bandwidth to use in subsequent requests. In this regard, the guard bandwidth need not be estimated by the guard bandwidth estimator 202 for each request, rather estimations from a previous signal decoding can be utilized where the previous estimation resulted in sufficient signal strength. Additionally, this information can be kept for various carriers to create a learning environment for the communications apparatus 200, for example.

Figure 3:
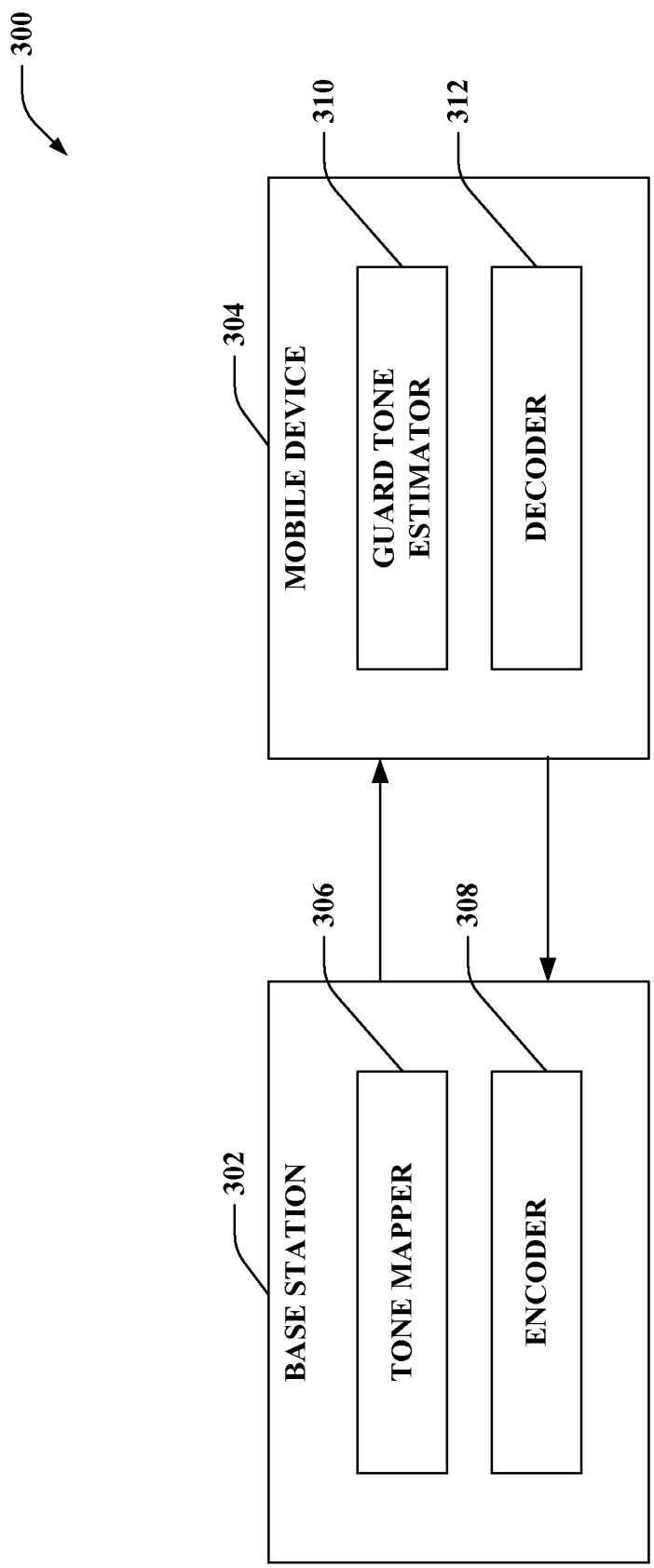
FIG. 3 is an illustration of an example wireless communications system that effectuates guard tone independent mapping and de-mapping of broadcast symbols.

Now referring to FIG. 3, a wireless communications system 300 that effectuates guard tone independent signal broadcasting is illustrated. The wireless communications system 300 includes a base station 302 that communicates with a mobile device 304 (and/or any number of disparate mobile devices (not shown)). The base station 302 can transmit information to the mobile device 304 over a forward link channel, for example; further, the base station 302 can receive information from the mobile device 304 over a reverse link channel. Moreover, the wireless communications system 300 can be a MIMO system in one example.

The base station 302 can include a tone mapper 306 that maps a plurality of symbols in a bandwidth to tones for transmission thereof. Additionally, the base station 302 can comprise an encoder 308 to map a data packet to a plurality of symbols, for example. In an example, a message (such as a broadcast message) can be initialized and encoded to a plurality of symbols by the encoder 308. The symbols can be mapped to a predetermined set of tones over a bandwidth for transmission to a mobile device 304 by the tone mapper 306. The bandwidth can have one or more associated guard tones at the ends of the bandwidth to allow additional carriers to transmit on the same frequency, for example. Thus, the symbols that map to guard tones in the symbol mapping process performed by the tone mapper 306 can be zeroed out (e.g. reducing energy to zero or another low number and/or modulating the symbol with zero energy). Subsequently, the resulting tones can be transformed into the time domain (such as by IFFT), for instance, and broadcast to one or more mobile devices 304. In an example, the symbols that map to zeroed out tones can be unnecessary for interpreting the data in the broadcast signal such that the data in the zeroed out symbols need not be transmitted. According to one example, the signal carrier can be a 5 MHz carrier, for example, having 512 preamble tones. The broadcast symbols can be mapped to all 512 tones by the tone mapper 306 as if they all exist, though some of them can be guard tones (e.g. a number of tones at each end of the bandwidth according to a deployment configuration). The symbols that match to guard tones can be punctured to reduce the energy to zero or some other low number or to modulate the symbol with zero energy, for example. The symbols can be transformed to a time domain, for example using an IFFT, for subsequent broadcasting thereof over the non-guard tones.

The mobile device 304 can include a guard tone estimator 310 to estimate the number of guard tones in the bandwidth of a broadcast signal and a decoder 312 to decode a portion of the transformed broadcast signal. In one example, the mobile device 304 can receive a broadcast signal (such as one similar to that described supra) from the base station 302 and estimate or predetermine a number of guard tones in the broadcast signal using the guard tone estimator 310. Additionally or alternatively, the guard tone estimator 310 can predetermine or estimate the number of total data tones in the bandwidth. Subsequently, the determined non-guard tones can be transformed to a frequency domain (for example, by using a FFT) to produce a portion of the symbols. The symbols can be decoded into a data packet, or a portion thereof, by the decoder 312, for example, to obtain information comprised within the broadcast signal. This can facilitate further communication by allowing the mobile device 304 to receive and utilize information regarding the base station 302 comprised in the broadcast signal, for example. According to an example, as the one described above, a 5 MHz broadcast signal can be sent from the base station 302 having 512 preamble tones. The guard tone estimator 310 can predetermine a number of guard tones on each end of the bandwidth, for example, and transform and/or decode the resulting center sequence of tones/symbols. If enough tones were read for the mobile device 304 to successfully decode the packet using the decoder 312, the read can be successful. This mitigates the need for the mobile device 304 to determine where the broadcast signal starts beyond the guard tones to correctly read the broadcast signal, for example. If more tones are needed to successfully decoded the data packet, the guard tone estimator 310 can decrease the predetermined number of guard tones until a successful read results (or until one or more guard tones are encountered, for example). Additionally, if guard tones are encountered, the guard tone estimator 310 can adaptively increase the estimated number of guard tones. Using this approach, a read can contain no tones that have noise or symbols from other sectors, for example, which can prevent decoding failure. Additionally, mobile system determination processing can be simplified by mitigating dependency of mapping on guard tones (e.g. constantly guessing where the guard tones end and the transmission begins). Moreover, the mobile device 304, or a component thereof, can remember a number of predetermined guard tones resulting in a previously successful decoding of a broadcast message for one or more carriers and can identify the carrier upon receiving a new broadcast signal. The mobile device 304, or component thereof (such as the guard tone estimator 310, for example), can utilize the previous number of predetermined guard tones for transforming and/or decoding the new broadcast signal. In this regard as well, broadcast signal decoding can become more efficient.

Figure 4:
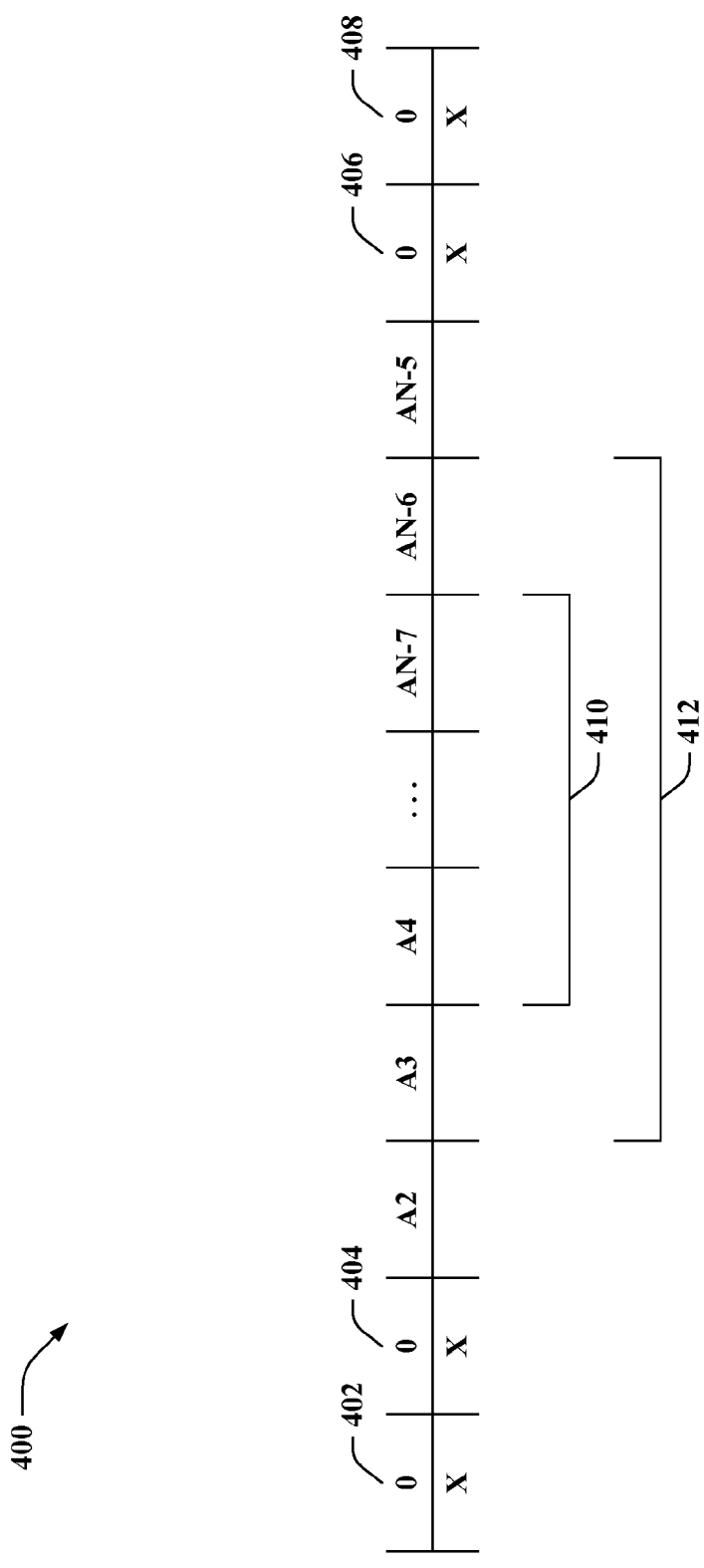
FIG. 4 is an illustration of example tones of a bandwidth to which symbols are mapped and guard tones are zeroed out.

Now referring to FIG. 4, an example broadcast message bandwidth 400 is shown having N frequency bins that can hold symbols or map the symbols to tones for transmission thereof (where N can be an integer greater than 0, but in this example figure must be at least 10). Slots A0, A1, AN-2 and AN-1 (represented respectively by reference numerals 402, 404, 406, and 408) can represent the guard tones in this example such that another carrier can transmit on either side of the bandwidth without leaking tones or symbols over to the illustrated bandwidth, for example. As described above, a base station or other access point/signal transmitter can initialize a broadcast message as a data packet, encode the packet into a plurality of symbols, and map the symbols to the bandwidth independent of the guard tone positions. In this regard, the bandwidth can be mapped using all of the displayed bins (e.g. from A0, represented by 402, to AN-1, represented by 408). In one example, the number of bins can be 512 for a 5 MHz carrier, for example, and substantially all 512 bins can be utilized in mapping the symbols to tones for transformation and transmission thereof. The symbols that map to the guard tone bins 402, 404, 406, and 408, for example, can be zeroed out (e.g. by reducing the energy to zero or some other low level and/or by modulating the symbols with zero energy). In one example, are simply dropped if they are not necessary for a successful transmission. The tones representing the broadcast message or signal can then be transformed and transmitted, for example.

Upon receiving the broadcast bandwidth, a mobile device, as shown in previous figures, can predetermine a number of guard tones (or a number of non-guard tones, for example). At 410, the mobile device can predetermine that there can be 4 guard tones on each end of the bandwidth for a total of 8 guard tones. The middle N-8 tones shown at 410 can be transformed and decoded to translate the broadcast signal. If the signal is sufficient to be decoded, the same number can be used for subsequent requests, for example. An adaptive algorithm can additionally be utilized such that on a subsequent decoding of a broadcast message, the predetermined number of guard tones can be lessened in an attempt to read as much of the bandwidth as possible. For example, the estimate can be lessened by one guard tone on each side (or two total tones), for example, and the middle N-6 tones can be transformed and decoded as shown at 412 where more bandwidth is desired. It is to be appreciated that the adaptive behavior can occur until one or more guard tones are hit. The adaptation can take place on subsequent broadcasts and/or the same broadcast depending on the strictness of the algorithm, for example. Moreover, the adaptive algorithm is not so limited to jumping one guard tone on each side at a time; rather more or less guard tones can be predetermined. Furthermore, the bandwidth can have a different number of guard tones on each side of the bandwidth such that the number on each side can be predetermined and/or adapted, for example. In addition, the adaptive algorithm can transform and decode a lesser number of tones, for example where guard tones are hit during transforming/decoding.

Figure 5:
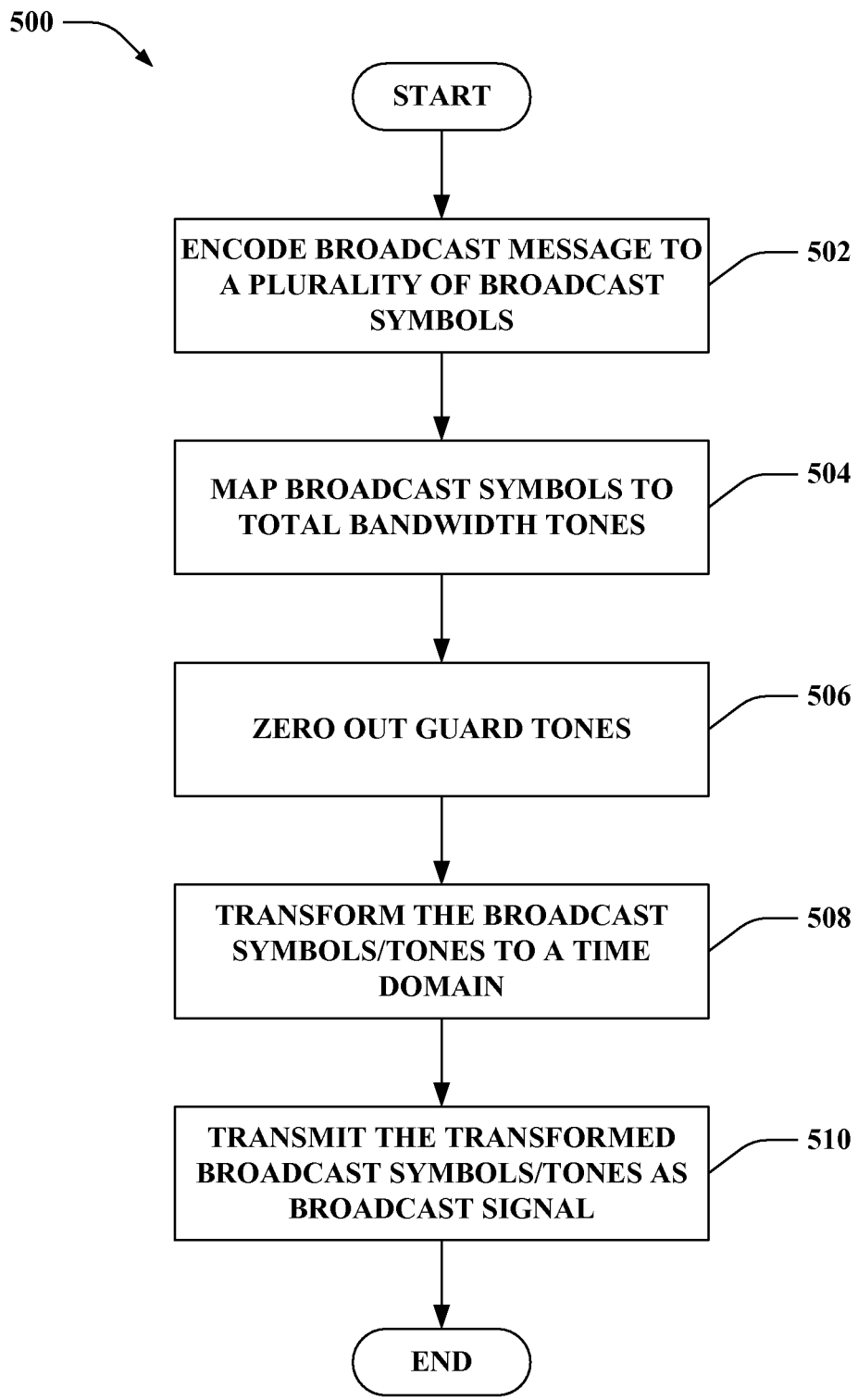
FIG. 5 is an illustration of an example methodology that facilitates mapping symbols to bandwidth independent of guard tones.
Figure 6:
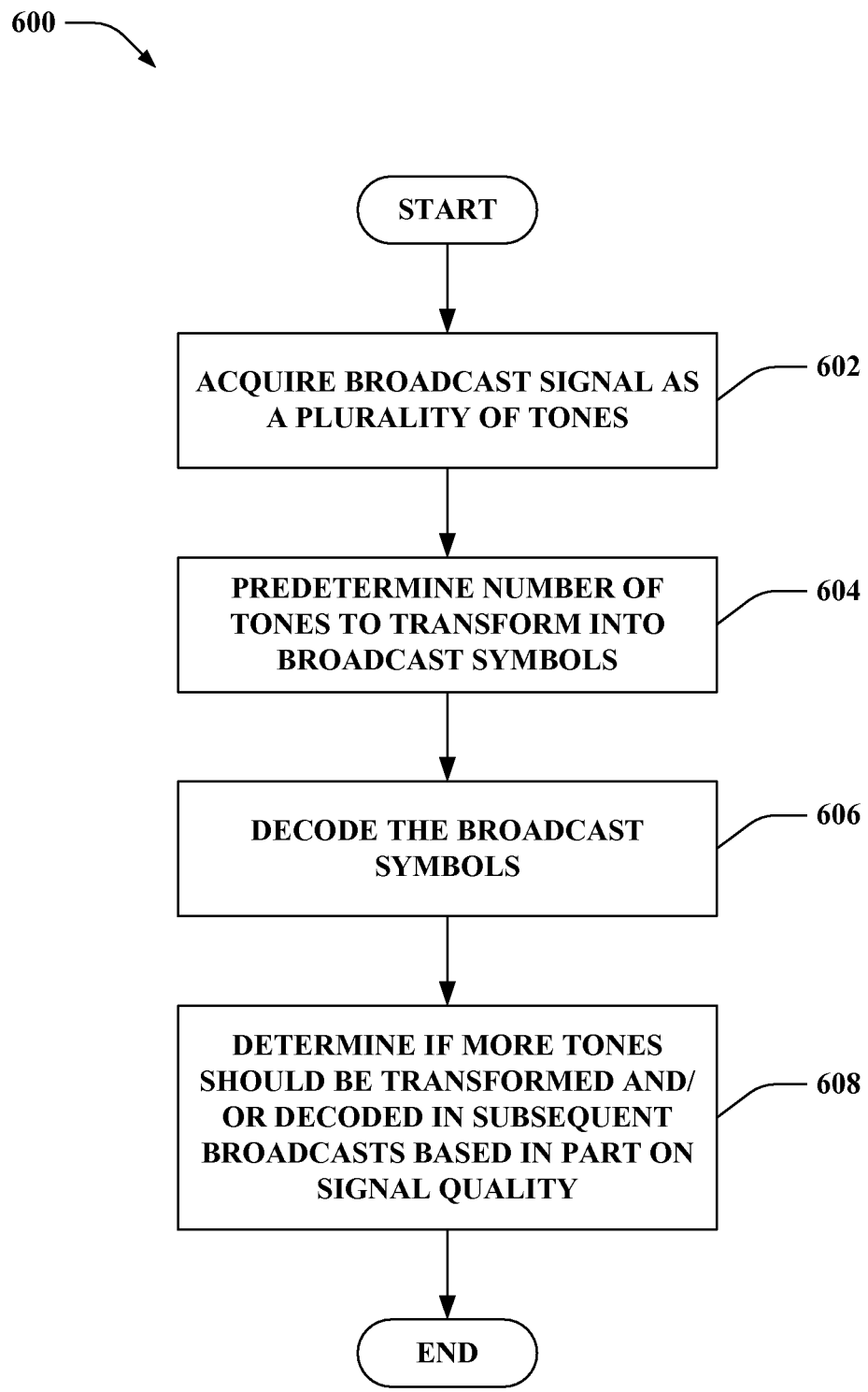
FIG. 6 is an illustration of an example methodology that facilitates transforming and decoding a center portion of bandwidth independent of the guard tones.

Referring to FIGS. 5-6, methodologies relating to guard tone independent mapping and de-mapping in wireless communication systems are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Now referring to FIG. 5, a methodology 500 that facilitates guard tone independent mapping of symbols is illustrated. At 502, a beacon message is encoded into a plurality of broadcast symbols; this can occur by utilizing a number of encoding schemes, for example. At 504, one or more broadcast symbols in a bandwidth can be mapped to tones corresponding to the entire bandwidth independent of guard tone location. Thus, the number of guard tones need not be ascertained before mapping the symbols to the tones, for example. In one example, the broadcast symbols can be included in a superframe preamble, for example. At 506, the guard tones can be zeroed out, such as by reducing the tone energy to zero or another nominal number and/or by modulating the symbol with zero energy, for example. The zeroed out tones can allow other carriers to transmit on either side of the bandwidth without interfering, for example. At 508, the broadcast symbols mapped to the tones can be transformed to a time domain, such as by utilizing an IFFT, for example. Subsequently, the transformed symbols/tones can be transmitted as a broadcast signal at 510, for example, for subsequent interpretation thereof by a receiving device. In this regard, guard tone independent mapping of the symbols to tones is facilitated.

With reference to FIG. 6, a methodology 600 that facilitates de-mapping and decoding a broadcast signal independent of the number of guard tones is displayed. At 602, the broadcast signal is acquired as a plurality of tones; for example, the signal can be read from a transmission or otherwise sent to one or more inquiring entities. At 604, the number of tones to transform into broadcast symbols from the signal can be predetermined. For example, the number of guard tones can be estimated and subtracted from the total number of tones, or the number of non-guard tones can be estimated. In this regard, the broadcast bandwidth can comprise a number of guard tones on each end of the bandwidth, and the number of tones to read can be predetermined as a reasonable number or a similar (or same) number as previously read for the same or disparate carrier, for example. Once a number is determined, the tones can be transformed/de-mapping to a plurality of corresponding broadcast symbols. In one example, this can be the middle tones of the bandwidth such that the guard tone position need not be ascertained to ensure non-guard tone transforming and/or decoding. At 606, the broadcast symbols can be decoded into a data packet and interpreted. Additionally, this decoding can be used to determine if more tones are needed for transformation/decoding as well. To this end, optionally at 608, an adaptive algorithm or method can be employed by determining if more tones should be transformed and subsequently decoded in subsequent broadcasts based on signal quality. Thus, where a decent number of guard tones are predetermined and are somewhat greater than the actual number, the signal quality can degrade as some of the tones are left untransformed or undecoded. In this way, less guard tones can be predetermined on subsequent broadcast signals to attempt better signal quality by transforming and subsequently decoding more tones. In one example, this can be for the same broadcast signal as well.

It will be appreciated that, in accordance with one or more aspects described herein, inferences can be made regarding predetermining the number of guard tones, decoding a number of broadcast symbols, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to predetermining the number of guard tones present in the broadcast signal. By way of further illustration, an inference can be made related to making the predetermination based on the number of tones in the bandwidth, previous reads on bandwidths with similar numbers of tones, previous reads on bandwidths of the same or similar carrier, sufficiency of the previous reads, information from other readers of the signals, and the like. It is to be appreciated that the foregoing examples are illustrative in nature and are not intended to limit the number of inferences that can be made or the manner in which such inferences are made in conjunction with the various embodiments and/or methods described herein.

Figure 7:
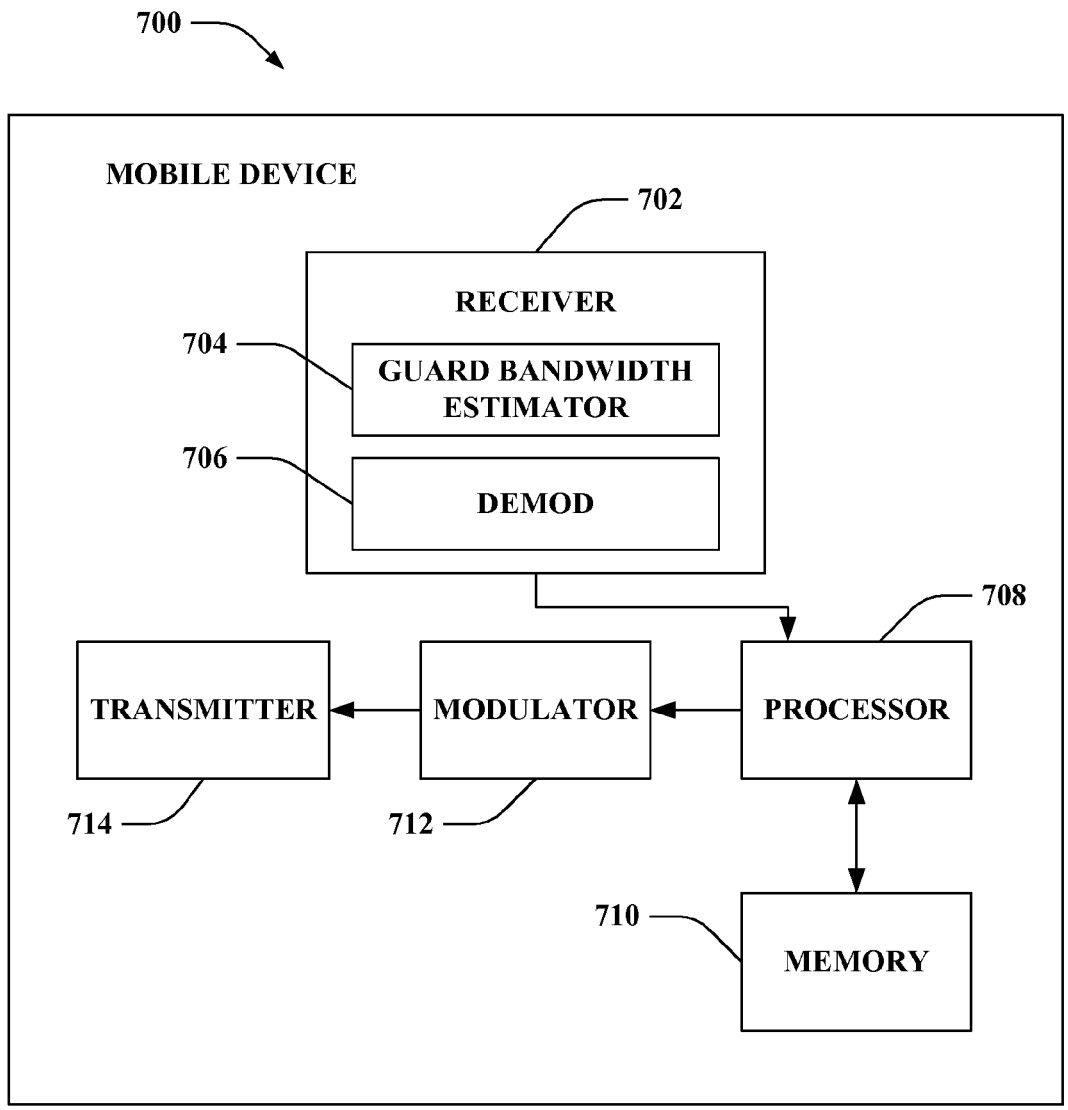
FIG. 7 is an illustration of an example mobile device that facilitates guard bandwidth independent de-mapping of a signal.

FIG. 7 is an illustration of a mobile device 700 that facilitates de-mapping tones in a broadcast signal independent of guard bandwidth, for example. Mobile device 700 comprises a receiver 702 that receives a signal from, for instance, a receive antenna (not shown), and performs typical actions (e.g., filters, amplifies, downconverts, etc.) on the received signal and digitizes the conditioned signal to obtain samples. Receiver 702 can be, for example, an MMSE receiver, and can comprise a guard bandwidth estimator 704 that can predetermine or estimate a size of guard bandwidth to determine a portion of a signal to demodulate and decode. Additionally, the mobile device 700 can comprise a demodulator 706 that can demodulate received symbols, besides the predetermined guard tones for example, and provide them to a processor 708 for channel estimation and/or decoding thereof. Processor 708 can be a processor dedicated to analyzing information received by receiver 702 and/or generating information for transmission by a transmitter 714, a processor that controls one or more components of mobile device 700, and/or a processor that both analyzes information received by receiver 702, generates information for transmission by transmitter 714, and controls one or more components of mobile device 700.

Mobile device 700 can additionally comprise memory 710 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 710 can additionally store protocols and/or algorithms associated with estimating and/or utilizing a channel (e.g., performance based, capacity based, etc.). Moreover, the memory 710 can store information related to a size of guard bandwidth in a signal, predetermined by the guard bandwidth estimator 704, for subsequent use, such as reading other signals and/or defining an adaptive algorithm that can decrease the predetermined size of the guard bandwidth in a signal to obtain greater signal quality, for example, or to demodulate a similar or different signal.

It will be appreciated that the data store (e.g., memory 710) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 710 of the subject systems and methods is intended to comprise, without being limited to, these and any other suitable types of memory.

According to an example, the receiver 702 can receive a signal, such as a broadcast signal, over a forward link (e.g. to a base station). Upon receiving the signal, the guard bandwidth estimator 704 can predetermine a size of the guard bandwidth, and the demodulator 706 can demodulate or de-map a center portion of the bandwidth to avoid the guard bandwidth at the edges of the signal. The guard bandwidth estimator 704 and/or the demodulator 706 can leverage the processor 708 to perform the foregoing tasks in one example. In accordance with an example, the received broadcast signal can comprise a plurality of broadcast tones with a number of guard tones (or zeroed out tones) at the ends. The guard bandwidth estimator 704 in this case can estimate or predetermine the number of guard tones, and the demodulator 706 can demodulate the central tones in the bandwidth into a plurality of symbols defined by exclusion of the predetermined number of guard tones (or a variation thereof), for instance. Subsequently, a data packet corresponding to the symbols can be decoded from the symbols. Variations can include predetermining a total number guard tones and dividing that by two to arrive at the number of estimated guard tones on each side of the bandwidth to skip in the demodulation process, estimating a number on each side of the bandwidth (which can be different, for example) and demodulating all but those tones, estimating the number of central tones to read (where to start and end, for example), and/or the like.

If one or more guard tones are involved in the demodulation step, the guard bandwidth estimator 704 can increase the amount of predetermined guard tones and a smaller center section of the bandwidth can be demodulated by the demodulator 706, for example, and decoded to produce a data packet. In this regard, the broadcast signal can be demodulated/demapped without determining the actual number of guard tones (e.g. by having to sample the signal over and over to find a starting and ending guard tone), which can increase efficiency in establishing wireless communications. Upon predetermining a size of guard bandwidth that resulted in a successful demodulation and/or decoding of the signal, the size (such as a number of tones in an OFDM context) can be stored in the memory 710 (such as by utilizing the processor 708) for demodulating subsequent signals, for example. The size can be used in the subsequent requests or diminished in an adaptive learning context as described supra, for example. Moreover, information regarding the guard bandwidth estimation can be sent to base stations or other devices (such as by direct communication or via base station on a reverse link, for example) by modulating the information with modulator 712 and transmitting the information to the device and/or base station using the transmitter 714. The other devices can utilize the information to effectively predetermine bandwidth and demodulate a central portion of the bandwidth free of guard bandwidth or tones, for instance.

Figure 8:
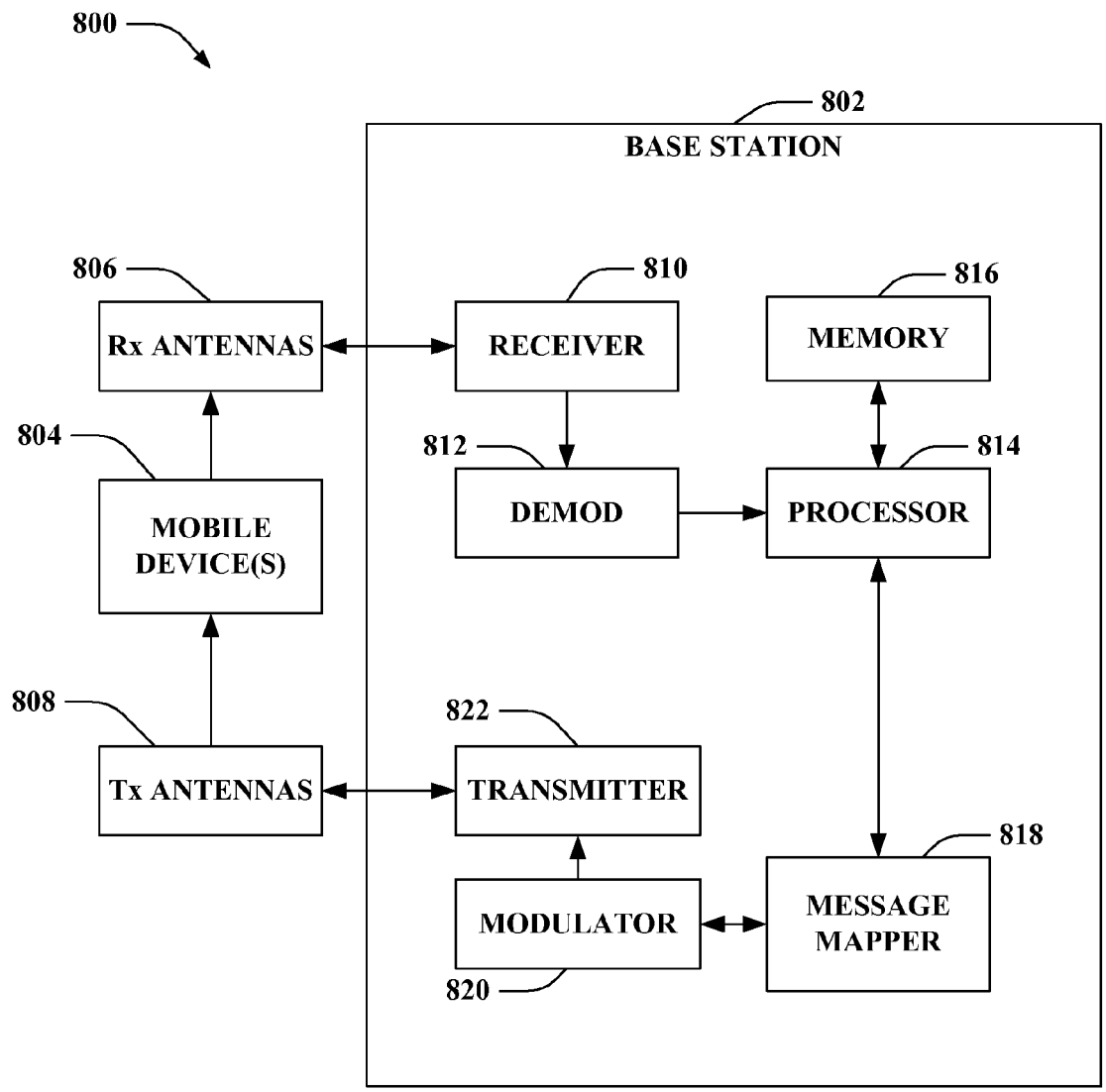
FIG. 8 is an illustration of an example system that facilitates guard tone independent mapping of broadcast bandwidth.

FIG. 8 is an illustration of a system 800 that facilitates initializing a broadcast signal independent of required or asserted guard bandwidth. The system 800 comprises a base station 802 (e.g., access point, . . . ) with a receiver 810 that receives signal(s) from one or more mobile devices 804 through a plurality of receive antennas 806, and a transmitter 822 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a message mapper 818 that can initialize and map a broadcast message for modulation thereof.

According to an example, the message mapper 818 can initialize a portion of bandwidth and map an encoded broadcast message thereto independent of any guard bandwidth associated therewith. Thus, the message is mapped by the message mapper 818 as if all of the bandwidth is available. The guard bandwidth can then be initialized on either side of the total bandwidth replacing some of the bandwidth utilized for the broadcast message with guard bandwidth (such as zeroed out bandwidth) to allow other carriers to transmit on the same channel or otherwise near the utilized bandwidth. This can be performed by the message mapper 818 and/or the modulator 820. The modulator can subsequently modulate the utilized bandwidth to a time domain, and the transmitter 822 can transmit the broadcast by using the transmit antennas 808. A mobile device 804 can receive the broadcast in one example.

According to a specific example, the message mapper 818 can map the symbols to tones without regard to location of one or more guard tones; rather, the entire bandwidth can be used to map the symbols to the tones. The message mapper 818 can zero out the tones (e.g. by reducing their energy to zero or another low number and/or modulating the tones with zero energy) that correspond to the guard tones without concern for the symbols mapped thereto, for example. The message mapper 818 can utilize the processor 814 to perform one or more of the tasks in one example. Subsequently, the modulator 820 can modulate the broadcast tones, and the transmitter 822 can leverage the transmit antennas 808 to broadcast or multicast the tones to one or more mobile devices 804, for example. It is to be appreciated that the modulator 820 can zero out the guard tones alternatively or in addition, for example.

Figure 9:
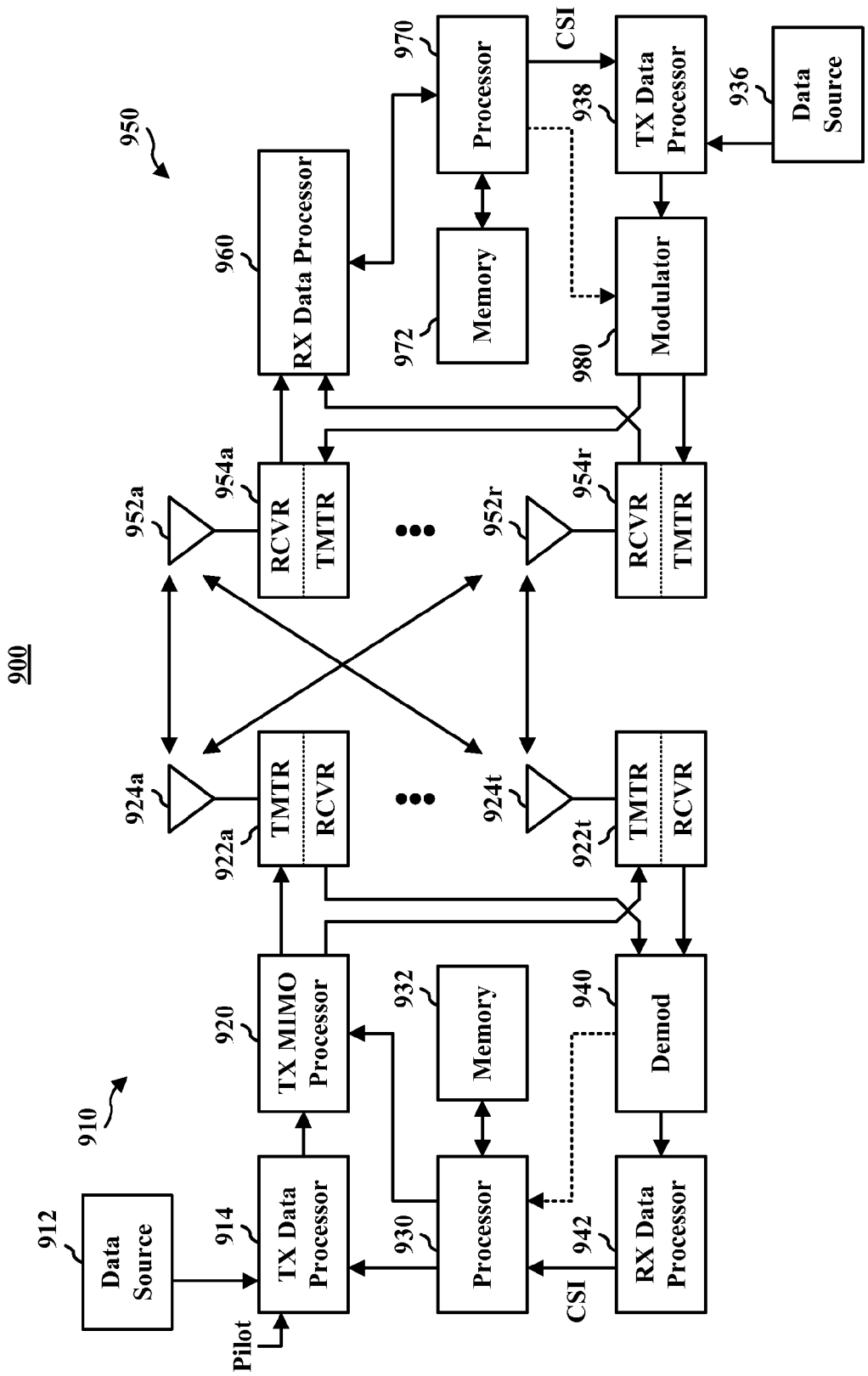
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
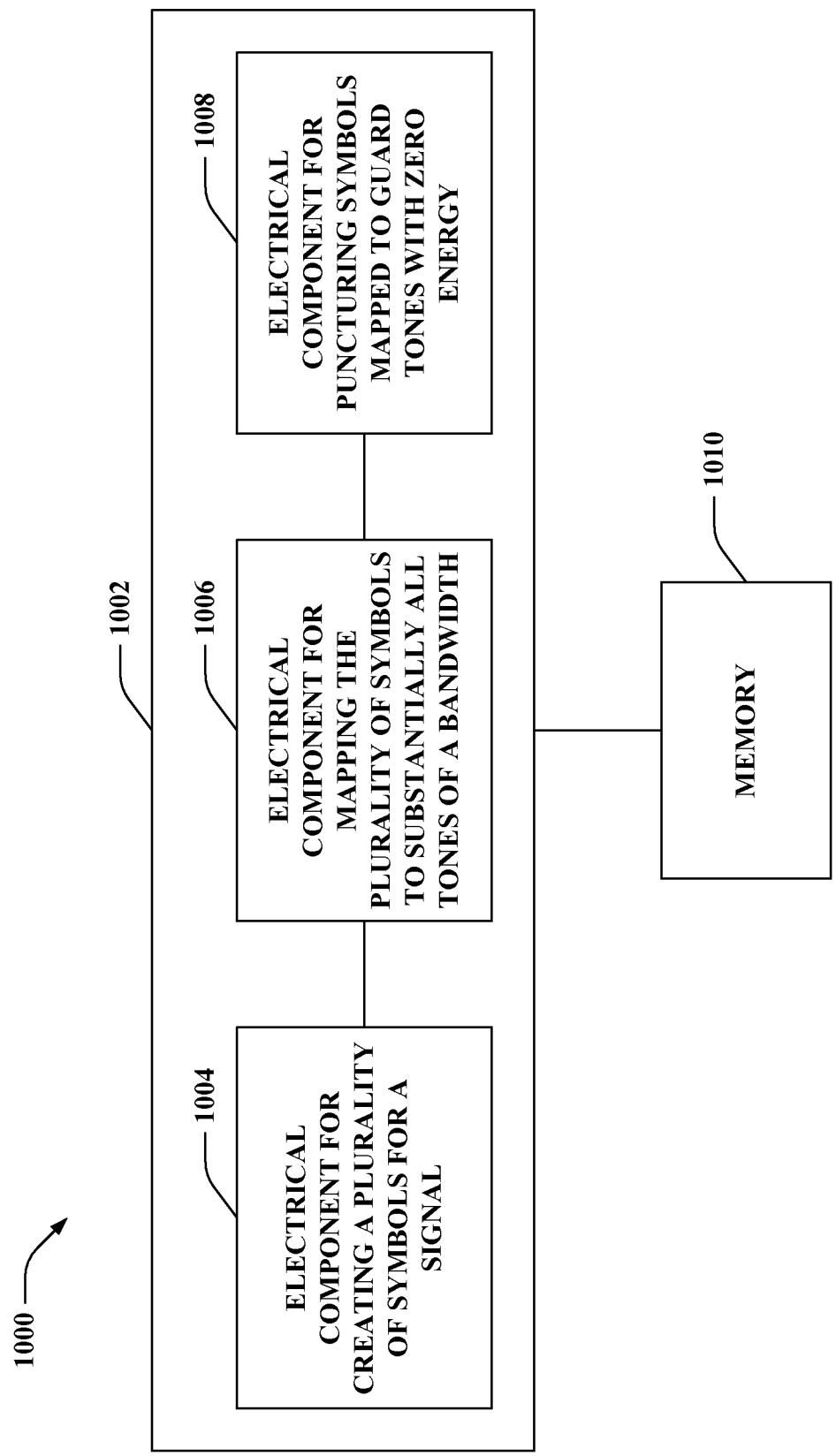
FIG. 10 is an illustration of an example system that maps broadcast symbols to tones independent of guard bandwidth.

With reference to FIG. 10, a system 1000 that maps symbols of a signal across a bandwidth independent of guard tones (e.g. as if all of the bandwidth is available) is illustrated. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for creating a plurality of symbols for a signal 1004. A broadcast signal can be initialized and encoded as a plurality of symbols, in one example, for transmission to one or more wireless mobile devices over a forward link channel; the forward link channel can be associated with a MIMO environment. Further, logical grouping 1002 can comprise an electrical component for mapping the plurality of symbols to substantially all tones of a bandwidth 1006. For example, the bandwidth can be a frequency channel, such as 5 MHz for example, having a plurality of frequency bins or tones; this can be 512 bins or tones in the 5 MHz example. Thus, the symbols are mapped to the tones regardless of any tones being reserved as guard tones (which can allow carriers to broadcast in adjacent frequencies without imposing on the subject frequency). Moreover, logical grouping 1002 can include an electrical component for puncturing symbols mapped to guard tones with zero energy 1008. According to an example, as partially described above, the symbols can be mapped over the entire available bandwidth without regard for guard tone positions; subsequently, the symbols at positions that are to correspond to guard tones (e.g. a number of tones at either end of the bandwidth) can be zeroed out. This can effectively include reducing the energy of the tones to zero or a substantially small number and/or modulating the tone with zero energy. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
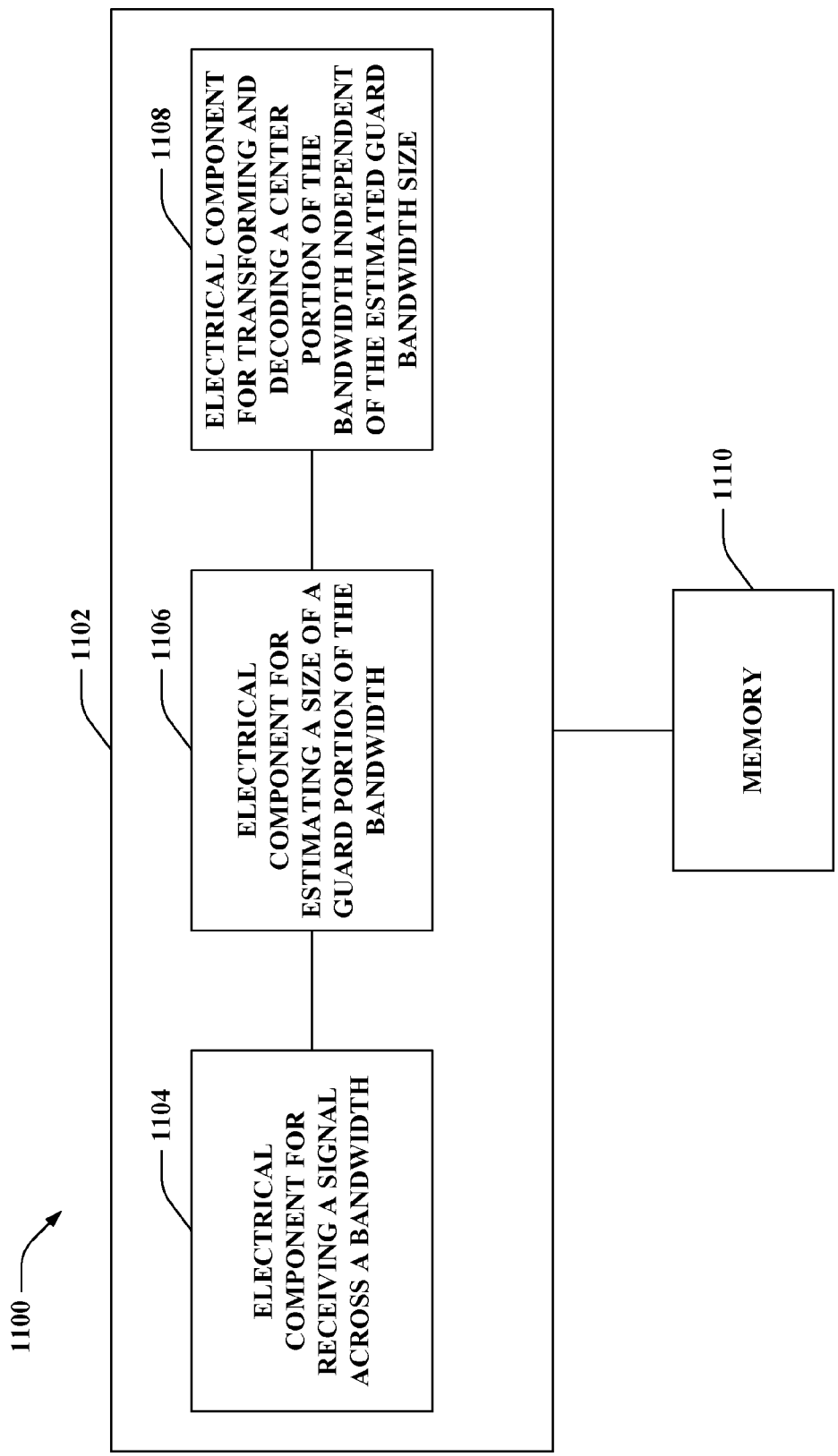
FIG. 11 is an illustration of an example system that transforms and decodes a guard tone free center portion of bandwidth related to a signal.

Turning to FIG. 11, a system 1100 is displayed that facilitates transforming a center portion of a signal independent of guard bandwidth to a frequency domain and decoding such; this can mitigate needing to locate the guard bandwidth before transforming and decoding, for example. System 1100 can reside at least partially within a mobile device, for instance. As depicted, system 1100 includes functional blocks that can represent functions implemented by a processor, software, or combination thereof (e.g., firmware). System 1100 includes a logical grouping 1102 of electrical components that facilitate controlling forward link transmission. Logical grouping 1102 can include an electrical component for receiving a signal across a bandwidth 1104. For example, the signal can be a broadcast signal from a new available carrier. In one example, the signal can comprise a plurality of tones that can transformed into a frequency domain for decoding into one or more symbols for interpretation thereof. Moreover, logical grouping 1102 can include an electrical component for estimating a size of a guard portion of the bandwidth 1106. As mentioned, guard bandwidth can be provided to allow other carriers to broadcast near the subject bandwidth without leaking data over. According to the previous example, the bandwidth can comprise a plurality of tones where the guard bandwidth is represented by one or more tones at each edge of the bandwidth. The number of guard tones can be estimated based on various factors and a correct estimation is not needed in this regard. Further, logical grouping 1102 can comprise an electrical component for transforming and decoding a center portion of the bandwidth independent of the estimated guard bandwidth size 1108. Furthering the above example, the center section of tones, minus the estimated guard tones on each side, can be transformed to a frequency domain and decoded to produce a data packet representing the signal. As described with respect to previous figures, if more of the signal is needed to properly interpret the signal, the guard bandwidth estimation can be decreased and the signal transformed and decoded with the additional tones. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates mapping to tones in a broadcast signal independent of guard tones, comprising:
   generating a plurality of symbols related to a signal;
   mapping the plurality of symbols to a predetermined plurality of tones across a bandwidth independent of guard tones; and
   zeroing out one or more the plurality of symbols mapped to an adaptable number of guard tones.

2. The method of claim 1, further comprising transmitting the plurality of symbols on the predetermined plurality of tones.

3. The method of claim 2, wherein a mobile device receives the plurality of symbols on the predetermined plurality of tones.

4. The method of claim 1, further comprising transforming the plurality of tones from a frequency domain to a time domain for transmission thereof.

5. The method of claim 1, wherein the plurality of symbols are broadcast symbols of a superframe preamble.

6. The method of claim 1, further comprising encoding the signal to generate the plurality of symbols.

7. The method of claim 1, zeroing out includes at least one of reducing energy of the guard tone substantially to zero or modulating the guard tone with substantially zero energy.

8. A wireless communications apparatus, comprising:
   at least one processor configured to map a plurality of broadcast symbols across a bandwidth independent of existing guard tones and zero out portions of the broadcast symbols that map to guard bandwidth, wherein the number of guard tones in the guard bandwidth is an adaptable number of guard tones; and
   a memory coupled to the at least one processor.

9. The wireless communications apparatus of claim 8, the at least one processor further configured to transmit the broadcast symbols over the bandwidth.

10. The wireless communications apparatus of claim 8, the zeroing out includes at least one or reducing energy of the guard bandwidth to substantially zero or modulating the guard bandwidth with substantially zero energy.

11. The wireless communications apparatus of claim 8, wherein the bandwidth comprises a predetermined plurality of tones, and the processor is configured to map the plurality of broadcast symbols across the predetermined plurality of tones and zero out one or more of the plurality of broadcast symbols that map to guard tones.

12. The wireless communications apparatus of claim 11, wherein the plurality of broadcast symbols are broadcast symbols of a superframe preamble.

13. The wireless communications apparatus of claim 12, wherein the predetermined plurality of tones comprise all of the tones of the bandwidth.

14. A wireless communication apparatus that facilitates guard tone independent mapping of signal symbols across a bandwidth, comprising:
    means for creating a plurality of symbols for a signal;
    means for mapping the plurality of symbols to substantially all tones of a bandwidth independent of existing guard tones; and
    means for puncturing symbols mapped to guard tones with zero energy, wherein the number of guard tones is an adaptable number of guard tones.

15. The wireless communications apparatus of claim 14, the means for puncturing symbols mapped to guard tones with zero energy comprises at least one of reducing the energy of the guard tones associated with the punctured symbols to substantially zero or modulating the guard tone with zero energy.

16. The wireless communications apparatus of claim 14, further comprising means for transmitting the signal across the tones of the bandwidth that are not the guard tones.

17. The wireless communications apparatus of claim 14, wherein a mobile device receives the plurality of symbols on the tones of the bandwidth.

18. The wireless communications apparatus of claim 14, further comprising means for transforming the tones of the bandwidth from a frequency domain to a time domain for transmission thereof.

19. The wireless communications apparatus of claim 14, wherein the plurality of symbols are broadcast symbols of a superframe preamble.

20. A computer program product, comprising:
    a non-transitory computer-readable medium comprising:
      code for causing at least one computer to generate a plurality of symbols related to a signal;
      code for causing the at least one computer to map the plurality of symbols to a predetermined plurality of tones across a bandwidth independent of existing guard tones; and
      code for causing the at least one computer to zero out one or more of the plurality of symbols mapped to guard tones, wherein the number of guard tones is an adaptable number of guard tones.

21. The computer program product of claim 20, the non-transitory computer-readable medium further comprising code for causing the at least one computer to transmit the plurality of symbols on the predetermined plurality of tones.

22. A wireless communication apparatus, comprising:
a processor configured to:
- create a plurality of symbols for a signal;
- map the plurality of symbols to substantially all tones of a bandwidth independent of existing guard tones; and
- puncture symbols mapped to guard tones with zero energy, wherein the number of guard tones is an adaptable number of guard tones; and a memory coupled to the processor.

* * * * *